Figure 1:
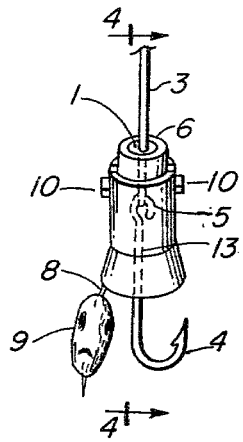

United States Patent [19]

Thesz

[11] 4,248,003
[45] Feb. 3, 1981

[54] LIVE FISH BAIT ATTACHER

[76] Inventor: Adam A. Thesz, 2905 W. Shakespeare Ave., Chicago, Ill. 60647

[21] Appl. No.: 63,455

[22] Filed: Aug. 3, 1979

[51] Int. Cl.³ .............................................. A01K 83/06
[52] U.S. Cl. ...................................................... 43/44.8
[58] Field of Search ............ 43/41, 44.2, 44.8, 44.91, 43/44.9, 44.86, 44.93

[56] References Cited

U.S. PATENT DOCUMENTS

| 2,634,540 | 4/1953 | Nelson | 43/41 X |
| 3,046,691 | 7/1962 | Courtright | 43/44.8 |
| 3,399,483 | 9/1968 | Naffziger | 43/44.8 X |
| 3,914,896 | 10/1975 | Sahagian | 43/41 |

FOREIGN PATENT DOCUMENTS 544155  7/1957  Canada ............................ 43/44.8

Primary Examiner—Nicholas P. Godici
Attorney, Agent, or Firm—Daniel C. Pinkus

[57] ABSTRACT

A fishing device or live fish bait attacher having an inner core with a vertical slit for holding a fish hook in a rigid upright position in conjunction with a cylindrical flanged sleeve and an outer cylindrical shell for holding the live bait in a horizontal position by its top fin or the top fin of its tail, so that the live bait can continue to be alive and to swim in the water to attract a game fish.

7 Claims, 5 Drawing Figures

U.S. Patent  Feb. 3, 1981  4,248,003

LIVE FISH BAIT ATTACHER

LIVE FISH BAIT ATTACHER

This invention relates to a method of attaching live bait, such as a minnow, to a fishing device called a "Live fish bait attacher", whereby the minnow is not impaled on the fish hook itself. This allows the minnow to remain alive and be able to swim in the water to attract the game fish. Usually in order to bait a hook, you have to impale the minnow on the hook, thereby damaging the minnow, sometimes killing it, or maybe cutting your hands on the barb of the hook in doing so. This method eliminates the impaling of the hook through the body of the minnow(bait).

It is a further object of the invention to provide a fish lure(live bait device), which will allow the bait to remain alive for long periods of time, and have the freedom of movement to swim and thereby attract the game fish. Another object of this invention is to secure a live minnow by its top fin or the top of its tail fin so that it can continue to swim in the water.

Another object of the invention is to provide a fish lure which is easy to assemble and disassemble at will.

Further objects, advantages and features of the invention will become apparent from the following disclosure.

Figure 2:
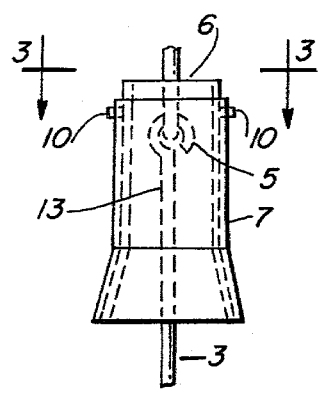
Figure 3:
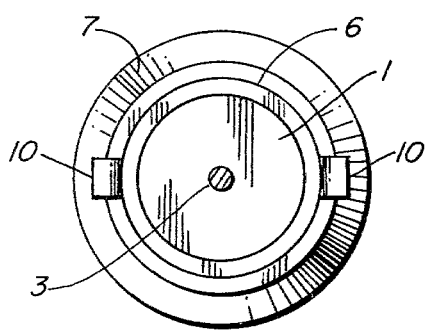
Figure 4:
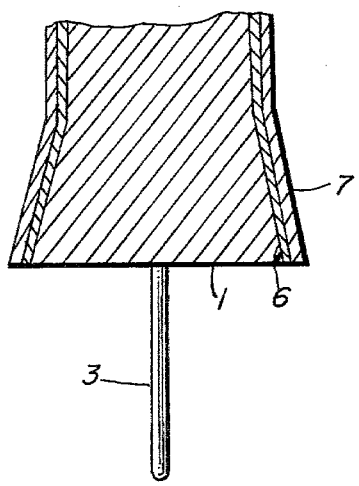
Figure 5:
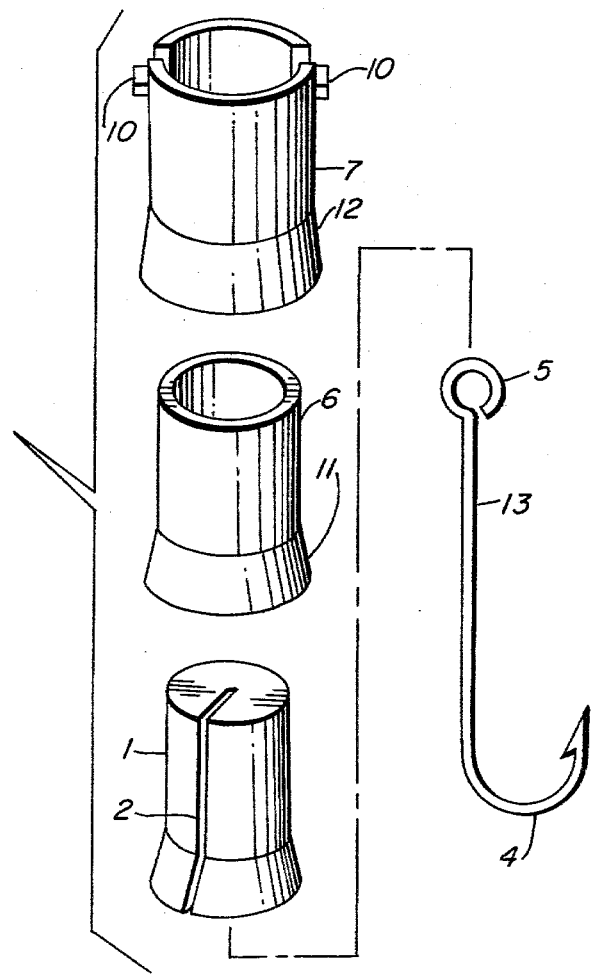

Referring to the drawings;

FIG. 1 is a perspective view of the live bait attacher device showing the live bait in position, FIG. 2 is a side elevation of the invention showing the various parts as they are in position, FIG. 3 is a top view of FIG. 2 taken on line 3—3, FIG. 4 is a side sectional view taken on line 4—4 of FIG. 1, and FIG. 5 is an exploded view of each of the parts of the device as shown in FIG. 1.

The concepts and structure of the invention will be understood more readily by reference to the following description when taken with the accompanying drawings.

Referring to the drawings, there is a core 1 which is made of a resilient material such as cork, rubber, sponge or a composition material. There is a slit 2 in the core 1 running its full length, and inserted in this silt is a lead wire 3 of the shank 13 of the hook 4. The lead wire or the shank portion can be held in the slit 2, depending on whether the fishing line has a hook lead wire or just a hook 4. There is an eye 5 on the end of the hook 4 for Connection to the fish line or the lead wire 3. An inner flanged cylinder sleeve 6 slips over the core 1 to close the slit opening 2 tightly around the lead wire 3 or the shank 13 to hold said lead wire and hook 4 securely in position. The lower section of the sleeve 6 is flanges as shown by numeral 11. An outer shell 7 of metal, being cylindrical in shape and having a flanged section 12 at its lower end, slips over the sleeve 6 and thereby holds the fin 8 or the top of the tail fin of the live minnow 9 between the sleeve 6 and the shell 7. This keeps the live bait 9 in a natural horizontal position so that it can swim alongside the hook 4 and attract a game fish. When a fish sees the live bait 9 moving in the water, it will open its mouth to swallow same, and will become impaled on the hook 4 when it closes its mouth.

There are 2 projections or ears 10 at the top of the outer shell 7, and are used to assist in removing the outer shell 7 from the inner sleeve 6, and thereby releasing the bait 9. With the use of a pair of long nose pliers, the operation can be completed. One end of the pliers rests on the top edge of the sleeve 6, and the other end of the pliers on one of the ears 10. By applying pressure to the handle of the pliers, it will release the outer shell 7 from the iner sleeve 6, thereby releasing the fin 8 of the bait 9.

Various modifications and changes of this invention will become apparent to those skilled in the art without departing from the scope and spirit of the invention, and it should be understood that this invention is not to be unduly limited to the illustrated embodiment set forth hereinabove.

What is claimed is:

1. A fishing device for supporting a live bait in a horizontal position, so that it will remain alive and continue to swim to attract a game fish, including an inner core, a cylindrical sleeve surrounding the inner core and holding a fish hook and leader wire in a rigid verticl position within said inner core, an outer cylindrical shell surrounding said cylindrical sleeve for holding said live bait between said outer shell and said cylindrical sleeve and wherein said outer shell can be disengaged from the cylindrical sleeve to thereby release the live bait therefrom.

2. A fishing device according to claim 1, wherein the inner core is of a resilient material and has a slit the full length of it for holding the fish hook in a rigid upright position.

3. A fishing device according to claim 1, wherein the fish hook and the wire leader are attached together and held tightly in a slit in the inner core.

4. A fishing device according to claim 1, wherein the fish hook has a long shank which is held rigid in an upright position in a slit in the inner core.

5. A fishing device according to claim 1, wherein there are protruding projections on the top of the outer shell for easy disengagement of the outer shell from the cylindrical sleeve.

6. A fishing device according to claim 1, whereby the outer shell holds the fish bait by its top fin against the inner sleeve thereby keeping the bait in a horizontal position.

7. A fishing device according to claim 1, whereby the outer cylindrical shell holds the fish bait by the to fin of its tail against the inner sleeve thereby keeping the bait in a horizontal position.

* * * * *